Figures 1, 2:
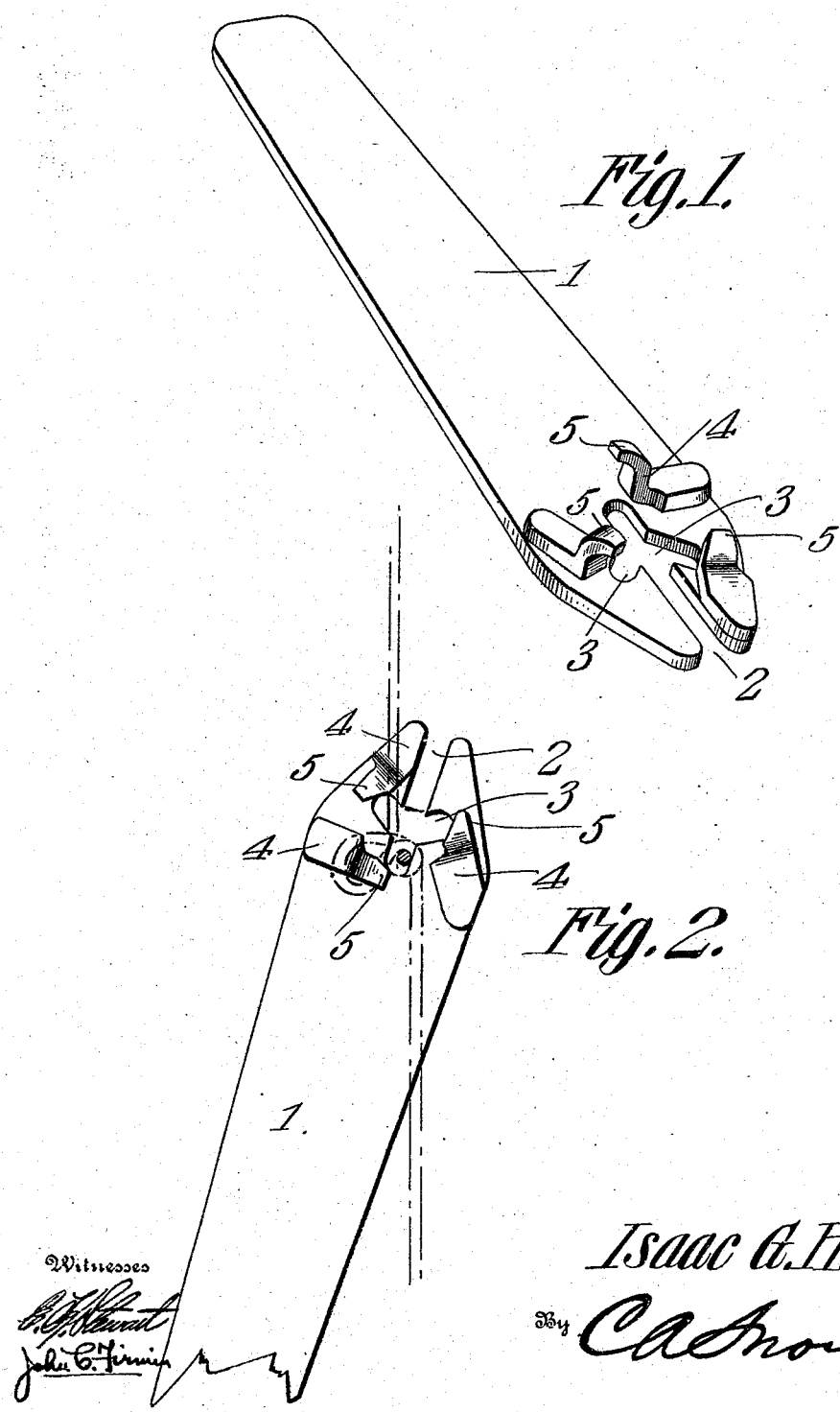

I. G. HUSTON.
WIRE SPLICER.
APPLICATION FILED MAY 4, 1909.

939,509.

Patented Nov. 9, 1909.

Witnesses

Inventor
Isaac G. Huston,
By C.A.Snow &Co.
Attorneys

UNITED STATES PATENT OFFICE.

ISAAC G. HUSTON, OF CAREY, OHIO.

WIRE-SPLICER.

939,509. Specification of Letters Patent. Patented Nov. 9, 1909.

Application filed May 4, 1909. Serial No. 493,937.

*To all whom it may concern:*

Be it known that I, ISAAC G. HUSTON, a citizen of the United States, residing at Carey, in the county of Wyandot and State of Ohio, have invented a new and useful Wire-Splicer, of which the following is a specification.

This invention has relation to wire splicers and it consists in the novel construction and arrangement of its parts as hereinafter shown and described.

The object of the invention is to provide a splicer as indicated which is of simple construction and which may be advantageously used for wrapping or splicing the stay wires upon the line wires of a fence or it may be used to advantage for splicing the ends of two wires together.

With the object mentioned above in view the splicer consists of a bar having a channel formed in one end thereof with recesses located at the opposite sides of the channel and communicating with the channel at points intermediate the ends thereof. A laterally disposed lug is positioned on the bar adjacent each of the said recesses and adjacent the inner end of the channel and the said lugs are preferably formed with tapered extremities whereby they may be conveniently withdrawn from a loop in case such a loop is made in the stay wire about the line wire. An advantage gained by this arrangement is that a succession of coils or loops may be formed in the stay wire without requiring a complete rotation of the splicer for, as the coil progresses in its formation, the tool may be so manipulated as to disengage one of the lugs from the stay wire and engage another lug therewith so that the implement may be used much in the nature of a ratchet wrench. Therefore the implement is especially adapted to be used in fence construction where the close proximity of the line wires is such as to render it impossible to describe a complete rotation with the splicing tool.

In the accompanying drawings, Figure 1 is a perspective view of the wire splicer. Fig. 2 is a side elevation of the same illustrating the manner in which a splice may be formed therewith.

The splicer consists of a bar 1 in one end of which is formed a channel or passage 2. Recesses 3 are located at opposite sides of said channel and communicate at their inner ends with the said channel at points intermediate the ends thereof. Adjacent each recess 3 and the inner end of the channel or passage 2 is positioned upon the bar 1 a lug 4. The said lugs taper toward their extremities as at 5, the object of which will be explained hereinafter.

In operation, presuming that the tool is used for the purpose of splicing stay wires of a fence structure to the line wires thereof, the channel 2 is passed along the line wire until the said wire is seated in the outer end of one of the recesses 3, then by turning the bar 1 upon the said line wire as an axis that lug 4 adjacent the recess in which the line wire is located will engage the stay wire and commence a convolution in the same. After the bar 1 has been given a partial revolution about the said line wire and the convolution in the stay wire is begun the said bar 1 may be swung back in a reverse direction upon the line wire and the succeeding lug 4 or the lug adjacent the next recess or the end of the passage 2 may be engaged with the stay wire and the said tool may be so moved that the line wire is brought into that recess adjacent the last said lug. The tool is then given a turn upon the line wire as an axis and the convolution commenced in the stay wire is continued another stage. At the completion of the movement of the bar 1 when the stay wire is in engagement with the last said lug the bar 1 is given a reverse turn and the next lug 4 is brought into engagement with the stay wire in a manner like that above described and the operation of continuing the convolution of the stay wire is continued. This operation may be repeated as often as necessary or desired for the purpose of effectually joining or connecting the stay wire with the line wire. By reason of the fact that the lugs 4 taper toward their outer ends it is possible to easily withdraw the same from the loop in the stay wire at the reverse movement of the bar during the operation of winding the stay wire upon the line wire.

Having described my invention what I claim as new and desire to secure by Letters Patent is:—

A wire splicer comprising a bar having a passage at one end and recesses formed in the bar at the opposite sides of the passage and communicating with the passage at points intermediate the ends thereof, and lugs located upon the bar one adjacent each recess and one adjacent the inner end of the passage.

In testimony that I claim the foregoing as my own, I have hereto affixed my signature in the presence of two witnesses.

ISAAC G. HUSTON.

Witnesses:
T. C. O'BRIEN,
OTTO GOTTFRIED.